United States Patent [19]

Schwarte et al.

[11] Patent Number: 5,514,746

[45] Date of Patent: * May 7, 1996

[54] PROCESS FOR THE PRODUCTION OF A MULTICOAT COATING, AQUEOUS COATING COMPOSITIONS, WATER-THINNABLE POLY-ACRYLATE RESINS AND PROCESS FOR THE PREPARATION OF WATER-THINNABLE POLYACRYLATE RESINS

[75] Inventors: Stephan Schwarte, Emsdetten; Manfred Dangschat; Manfred Reimann, both of Drensteinfurt; Carlos Westermann, Münster, all of Germany

[73] Assignee: BASF Lacke + Farben, AG, Muenster Hiltrup, Germany

[*] Notice: The portion of the term of this patent subsequent to Nov. 30, 2012, has been disclaimed.

[21] Appl. No.: 927,428

[22] PCT Filed: Mar. 14, 1991

[86] PCT No.: PCT/EP91/00481

§ 371 Date: Oct. 30, 1992

§ 102(e) Date: Oct. 30, 1992

[87] PCT Pub. No.: WO91/14712

PCT Pub. Date: Oct. 3, 1991

[30] Foreign Application Priority Data

Mar. 28, 1990 [DE] Germany .................. 40 09 931.8

[51] Int. Cl.[6] .................................................. C08L 31/00
[52] U.S. Cl. .................... 524/556; 524/458; 524/460; 427/372.2; 427/385.5; 427/388.2; 427/388.4

[58] Field of Search .................... 427/372.2, 385.5, 427/388.2, 388.4; 524/556, 458, 460

[56] References Cited

U.S. PATENT DOCUMENTS

| 4,521,489 | 6/1985 | Rchfuss et al. ............... 428/412 |
| 4,539,363 | 9/1985 | Backhouse ..................... 524/460 |
| 4,677,004 | 6/1987 | Das et al. ...................... 427/407.1 |
| 4,730,020 | 3/1988 | Wilfinger et al. ............... 524/555 |
| 4,798,746 | 1/1989 | Claar et al. .................... 427/407.1 |
| 4,978,708 | 12/1990 | Fowler et al. ................. 524/507 |

FOREIGN PATENT DOCUMENTS 0238037  3/1987  European Pat. Off. .......... B05D 1/38

*Primary Examiner*—Edward J. Cain
*Attorney, Agent, or Firm*—Anne Gerry Sabourin

[57] ABSTRACT

The invention relates to a process for the production of a multicoat coating in which the aqueous topcoat composition contains a water-thinnable polyacrylate resin which has a hydroxyl value of 40 to 200, an acid value of 20 to 100 and a glass transition temperature ($T_G$) of −40° C. to +60° C., and can be prepared by adding a mixture (I) of a (meth)acrylic acid ester, a copolymerizable hydroxyl-containing monomer and, if appropriate, a further ethylenically unsaturated monomer to an organic solvent and carrying out free-radical polymerization and adding, at the end of the addition of the mixture (I), a mixture of a monomer containing carboxyl groups and a monomer free from carboxyl groups and continuing the polymerization.

11 Claims, No Drawings

PROCESS FOR THE PRODUCTION OF A MULTICOAT COATING, AQUEOUS COATING COMPOSITIONS, WATER-THINNABLE POLY-ACRYLATE RESINS AND PROCESS FOR THE PREPARATION OF WATER-THINNABLE POLYACRYLATE RESINS

The invention relates to a process for the production of a multicoat protective and/or decorative coating on a substrate surface, in which process (1) a pigmented basecoat composition is applied to the substrate surface, (2) a polymer film is formed from the composition applied in stage (1), (3) a transparent aqueous topcoat composition containing a water-thinnable polyacrylate resin as binder and an amino resin as crosslinking agent is applied to the basecoat obtained in this way and subsequently (4) the basecoat is baked together with the topcoat.

The invention also relates to aqueous coating compositions, to water-thinnable polyacrylate resins and to a process for the preparation of water-thinnable polyacrylate resins.

The process according to the preamble of claim 1 is known. It is used especially for the production of automotive metallic finishes (cf. for example U.S. Pat. No. 3,639,147, DE-A-3,333,072 and EP-A-38,127).

For ecological and economic reasons it is desirable to employ aqueous topcoat compositions in stage (3) of the so-called basecoat/clearcoat process described above.

The topcoat compositions must be capable of application by spraying using automatic painting equipment. For this purpose their solids content must, at spray viscosity, be sufficiently high to obtain paint films having adequate film thickness with two passes of the spray gun (cross passes), and they must furnish baked paint films of good appearance (good flow-out, high gloss, good topcoat appearance, etc.).

The aqueous topcoat composition disclosed in Example 2 of EP-A-38,127 does not meet all the above requirements.

The object forming the basis of the present invention consists in providing aqueous topcoat compositions which comply with the above requirements.

Surprisingly, this object is achieved by topcoat compositions containing a water-thinnable polyacrylate resin as binder, which resin can be obtained (I) by adding a mixture of (a1) a (meth)acrylic acid ester which is copolymerizable with (a2), (a3), (b1) and (b2) and is essentially free from carboxyl groups, or a mixture of such (meth)acrylic acid esters, and (a2) an ethylenically unsaturated monomer which is copolymerizable with (a1), (a3), (b1) and (b2), contains at least one hydroxyl group per molecule and is essentially free from carboxyl groups, or a mixture of such monomers, and, if appropriate, (a3) an ethylenically unsaturated monomer which is copolymerizable with (a1), (a2), (b1) and (b2), is essentially free from carboxyl groups and is different from (a1) and (a2), or a mixture of such monomers to an organic solvent or solvent mixture and carrying out a polymerization in the presence of at least one polymerization initiator, and (II) by adding, after at least 80% of the mixture consisting of (a1), (a2) and, if appropriate, (a3) has been added, (b1) more than 25 and less than 60, preferably 33–50% by weight of an ethylenically unsaturated monomer which contains at least one carboxyl group per molecule and is copolymerizable with (a1), (a2), (a3) and (b2), or a mixture of such monomers, together with (b2) 40–75% by weight of an ethylenically unsaturated monomer which is free from carboxyl groups and is copolymerizable with (a1), (a2), (a3) and (b1), or a mixture of such monomers, and carrying out further polymerization, and (III) by neutralizing, at least partially, the polyacrylate resin obtained at the end of the polymerization and dispersing it in water, the sum of the proportions by weight of (b1) and (b2) always being 100% by weight and the type and amount of (a1), (a2), (a3), (b1) and (b2) being chosen so that the polyacrylate resin has a hydroxyl value of 40 to 200, preferably 60 to 140, an acid value of 20 to 100, preferably 25 to 50, and a glass transition temperature ($T_G$) of $-40°$ C. to $+60°$ C., preferably $-20°$ C. to $+40°$ C.

The pigmented basecoat compositions to be applied in stage (1) of the process according to the invention are well known (cf. for example U.S. Pat. No. 3,639,147, EP-A-38,127, DE-A-3,333,072 and EP-A-279,813). Basecoat compositions containing metallic pigments, especially aluminum pigments, are preferably used in stage (1). Metallic finishes are obtained in this way.

A more detailed description of the preparation of the polyacrylate resins to be used according to the invention is preceded by an explanation of two of the terms used:

1.) The term "(meth)acrylic acid" is occasionally used as an abbreviation for "methacrylic acid or acrylic acid".

2.) The expression "essentially free from carboxyl groups" is intended to indicate that the components (a1), (a2) and (a3) can have a low carboxyl group content (but no higher than would cause the polyacrylate resin prepared from the components (a1), (a2) and (a3) to have an acid value no higher than 10). It is preferred, however, for the carboxyl group content of the components (a1), (a2) and (a3) to be kept as low as possible. Components (a1), (a2) and (a3) which are free from carboxyl groups are particularly preferred.

For the preparation of the polyacrylate resins to be used according to the invention, any ester of (meth)acrylic acid which is copolymerizable with (a2), (a3), (b1) and (b2) and is essentially free from carboxyl groups, or a mixture of such (meth)acrylic acid esters, may be used as the component (a1). Suitable examples are alkyl acrylates and alkyl methacrylates having up to 20 carbon atoms in the alkyl radical, for example methyl, ethyl, propyl, butyl, hexyl, ethylhexyl, stearyl and lauryl acrylate and methacrylate, and cycloaliphatic (meth)acrylic acid esters, for example cyclohexyl (meth)acrylate. Mixtures of alkyl acrylates and/or alkyl methacrylates consisting of at least 25% by weight of n-butyl and/or t-butyl acrylate and/or n-butyl and/or t-butyl methacrylate, are preferably used as the component (a1).

Any ethylenically unsaturated monomer which is copolymerizable with (a1), (a3), (b1) and (b2), contains at least one hydroxyl group per molecule and is essentially free from carboxyl groups, or a mixture of such monomers, may be used as the component (a2). Suitable examples are hydroxyalkyl acrylates, hydroxyalkyl methacrylates or hydroxyalkyl esters of another $\alpha,\beta$-ethylenically unsaturated carboxylic acid. These esters can be derived from an alkylene glycol, which is esterified with the acid, or they may be obtained by reacting the acid with an alkylene oxide. Hydroxyalkyl acrylates and hydroxyalkyl methacrylates in which the hydroxyalkyl group contains up to 4 carbon atoms, reaction products of cyclic esters, such as ε-caprolactone, and these hydroxyalkyl esters or mixtures of these hydroxyalkyl esters or ε-caprolactone-modified hydroxyalkyl esters, are preferably used as the component (a2). Suitable examples of such hydroxyalkyl esters are 2-hydroxyethyl acrylate, 2-hydroxypropyl methacrylate, 2-hydroxypropyl acrylate, 3-hydroxypropyl methacrylate, 3-hydroxypropyl acrylate, 2-hydroxyethyl methacrylate, 4-hydroxybutyl acrylate and 4-hydroxybutyl methacrylate. Corresponding esters of other unsaturated acids, for example ethacrylic acid, crotonic acid and similar acids having up to about 6 carbon atoms in the molecule, may likewise be used.

Any ethylenically unsaturated monomer which is copolymerizable with (a1), (a2), (b1) and (b2), is different from (a1) and (a2) and is essentially free from carboxyl groups, or a mixture of such monomers, may be used as the component (a3). Vinylaromatic hydrocarbons, such as styrene, α-alkylstyrene and vinyltoluene, are preferably used as the component (a3).

The components (a1), (a2) and, if appropriate, (a3) are mixed, if appropriate, in an organic solvent and are added to an organic solvent or solvent mixture and polymerization is carried out in this solution in the presence of at least one polymerization initiator. Solvents and polymerization initiators which are customary for the preparation of polyacrylate resins and suitable for the preparation of aqueous dispersions are used as the organic solvents and polymerization initiators. Examples of usable solvents are butyl glycol, 2-methoxypropanol, n-butanol, methoxybutanol, n-propanol, ethylene glycol monomethyl ether, ethylene glycol monoethyl ether, ethylene glycol monobutyl ether, diethylene glycol monomethyl ether, diethylene glycol monoethyl ether, diethylene glycol diethyl ether, diethylene glycol monobutyl ether, ethyl 2-hydroxypropionate and 3-methyl-3-methoxybutanol. Examples of usable polymerization initiators are initiators forming free radicals, for example t-butyl perethylhexanoate, benzoyl peroxide, azobisisobutyronitrile and t-butyl perbenzoate. The polymerization is expediently carried out at a temperature of 80° to 160° C., preferably 110° to 160° C. The mixture of (a1), (a2) and, if appropriate, (a3) is added to the organic solvent or solvent mixture in the course of 2 to 8 hours, preferably in the course of 3 to 6 hours and polymerization is carried out in this solution in the presence of at least one free radical-forming initiator.

After at least 80% by weight, preferably 100% by weight, of the mixture consisting of (a1), (a2) and, if appropriate, (a3) has been added, (b1) more than 25 and less than 60, preferably 33–50% by weight, of an ethylenically unsaturated monomer which contains at least one carboxyl group per molecule and is copolymerizable with (a1), (a2), (a3) and (b2), or a mixture of such monomers, together with (b2) 40 to 75% by weight of an ethylenically unsaturated monomer which is free from carboxyl groups and is copolymerizable with (a1), (a2), (a3) and (b1), or a mixture of such monomers, are added in stage (II) and polymerization is continued until the monomers added in stage (I) and (II) have essentially completely reacted.

The addition of the mixture consisting of (b1) and (b2) should not commence before at least 80% by weight, preferably at least 90% by weight, of the monomers added in stage (I) have reacted. It is particularly preferred not to commence the addition of the mixture consisting of (b1) and (b2) before the monomers added in stage (I) have essentially completely reacted. In this context it is expedient to interrupt the initiator feed after about 30 minutes from the end of the addition of the mixture of (a1), (a2) and, if appropriate, (a3) and restart the initiator feed when the addition of the mixture of (b1) and (b2) commences.

Any ethylenically unsaturated monomer which contains at least one carboxyl group per molecule and is copolymerizable with (a1), (a2), (a3) and (b2), or a mixture of such monomers, may be used as the component (b1). Acrylic acid and/or methacrylic acid are preferably used as the component (b1). However, other ethylenically unsaturated acids having up to 6 carbon atoms in the molecule may also be used. Examples of such acids are ethacrylic acid, crotonic acid, maleic acid, fumaric acid and itaconic acid. Mono(meth)acryloyloxyethyl maleate, mono(meth)acryloyloxyethyl succinate and mono(meth)acryloyloxyethyl phthalate may likewise be used as the component (b1).

Any ethylenically unsaturated monomer which is copolymerizable with (a1), (a2), (a3) and (b1), or a mixture of such monomers, may be used as the component (b2). Each of the monomers listed in the description of the components (a1), (a2) and (a3) may be used as the component (b2).

The mixture of the components (b1) and (b2) is added preferably within 10 to 90 minutes, particularly preferably within 30 to 75 minutes.

At the end of the addition of the mixture of (b1) and (b2) polymerization is continued until all the monomers used have essentially completely reacted.

The type and amount of the components (a1), (a2), (a3), (b1) and (b2) are chosen so that the reaction product has a hydroxyl value of 40 to 200, preferably of 60 to 140, an acid value of 20 to 100, preferably of 25 to 50, and a glass transition temperature ($T_G$) of –40° C. to +60° C., preferably of –20° C. to +40° C.

The glass transition temperatures of polyacrylate resins can be calculated from the following formula:

$$\frac{1}{T_G} \quad \sum_{n=1}^{n=x} \quad \frac{W_n}{T_{Gn}}$$

$T_G$= glass transition temperature of the polyacrylate resin x= number of the various monomers incorporated in the polyacrylate resin $W_n$= proportion by weight of the nth monomer $T_{Gn}$= glass transition temperature of the homopolymer from the nth monomer The amount and rate of addition of the initiator are preferably chosen so that a polyacrylate resin having a number average molecular weight of 2500 to 20,000 is obtained. It is preferred to commence the initiator addition at the same time as the addition of the mixture of the components (a1), (a2) and, if appropriate, (a3), and to terminate the addition about a half-hour after the addition of the mixture of (b1) and (b2) has been terminated. The initiator is preferably added in a constant amount per unit of time. At the end of the initiator addition the reaction mixture is kept at the polymerization temperature long enough (usually 1½ hours) for all the monomers used to have essentially completely reacted. The term 'essentially completely reacted' is intended to mean that 100% by weight of the monomers used has reacted, but that it is also possible for a small residual monomer content of not more than about 0.5% by weight, based on the weight of the reaction mixture, to remain unreacted.

The polyacrylate resins according to the invention are prepared using 40 to 90% by weight, preferably 40 to 80% by weight, of the component (a1), 10 to 45% by weight, preferably 12 to 35% by weight, of the component (a2), 0 to 25% by weight, preferably 8 to 20% by weight, of the component (a3), 2.5 to 15% by weight, preferably 3 to 7% by weight, of the component (b1) and 4 to 60% by weight, preferably 5 to 28% by weight, of the component (b2), the sum of the proportions by weight of (a1), (a2), (a3), (b1) and (b2) always being 100% by weight.

At the end of the polymerization the resultant polyacrylate resin is neutralized, at least partially, and dispersed in water.

Organic bases as well as inorganic bases may be used for the neutralization. Primary, secondary and tertiary amines, for example ethylamine, propylamine, dimethylamine, dibutylamine, cyclohexylamine, benzylamine, morpholine, piperidine and triethanolamine are preferably used. Tertiaryamines, in particular dimethylethanolamine, triethylamine, dimethylisopropylamine, tripropylamine and tributylamine, are particularly preferably used as neutralizing agents.

The neutralization reaction is generally performed by mixing the neutralizing base with the polyacrylate resin. The amount of the base used is preferably such that the pH of the topcoat composition is 7–8.5, preferably 7.2 to 7.8.

The partially or fully neutralized polyacrylate resin is then dispersed by the addition of water, giving rise to an aqueous polyacrylate resin dispersion. If desired, some or all of the organic solvent may be distilled off. The polyacrylate resin dispersions according to the invention comprise polyacrylate resin particles whose average particle size is preferably between 60 and 300 nm (method of measurement: laser light scattering; measuring instrument: Malvern Autosizer 2C).

Topcoat compositions according to the invention are obtained from the aqueous polyacrylate resin dispersions obtained in this way using generally known methods by admixing an amino resin and, if appropriate, other additives, such as flow control agents, UV stabilizers, transparent pigments etc.

The topcoat compositions according to the invention preferably comprise enough amino resin for the weight ratio between polyacrylate resin solid and amino resin solid to be 60:40 to 90:10, particularly preferably 70:30 to 85:15.

Any amino resin which can be processed with the polyacrylate resin according to the invention to form a stable topcoat composition, may in principle be used as crosslinking agent. Melamine-formaldehyde resins which are partially or fully etherified with aliphatic alcohols containing preferably 1 to 4 carbon atoms per molecule, are preferably used as crosslinking agents.

Prior to application, the viscosity of the topcoat compositions according to the invention is adjusted to spray viscosity (generally 20 to 40 sec. efflux time from a DIN No. 4 Cup (DIN 53 211 (1974)) and their pH is adjusted to 7.0–8.5, preferably 7.2 to 7.8.

The topcoat compositions according to the invention possess, at spray viscosity, a solids content sufficiently high (20 to 45% by weight, preferably 32 to 40% by weight) for the paint films to have an adequate thickness, using one to two passes of the spray gun (cross passes) (the thickness of the baked paint film should preferably be between 25 and 45 μm), and furnish baked paint films having a very good appearance (good flow-out, high gloss, good topcoat appearance, etc.) and good mechanical-technological properties, and comprise a relatively low proportion of organic cosolvents (less than 35% by weight, based on the total solids content of binders and crosslinking agents).

When the topcoat compositions according to the invention are used together with water-thinnable basecoat compositions for the preparation of metallic finishes, metallic finishes are obtained in which the transparent topcoat adheres particularly well to the basecoat.

In addition to the polyacrylate resin used according to the invention, the topcoat compositions according to the invention may also comprise crosslinked polymer microparticles, such as those disclosed, for example, in EP-A-38,127, and/or other compatible resins, such as water-thinnable or water-soluble polyacrylate resins, polyester resins, alkyd resins or epoxy resin esters, and they may also be pigmented.

The topcoat compositions according to the invention may be employed both for production line finishing and for refinishing.

The invention is elucidated in greater detail in the examples below. All parts and percentages are by weight, unless expressly stated otherwise.

A. Preparation of topcoat compositions according to the invention

Topcoat composition 1 (T1)

32 parts by weight of butyl glycol are introduced into a steel reaction vessel fitted with a monomer feed, an initiator feed, a thermometer, oil heating and a reflux condenser, and the charge is heated to 110° C. A solution of 6.0 parts by weight of t-butyl perethylhexanoate in 6.0 parts by weight of butyl glycol is then added at such a rate that the addition is concluded after 5 h 30 min. The addition of the mixture of (a1): 24.1 parts by weight of n-butyl acrylate, 21.0 parts by weight of t-butyl acrylate, 15.0 parts by weight of methyl methacrylate, (a2): 24.9 parts by weight of hydroxypropyl acrylate and (a3): 15.0 parts by weight of styrene is commenced at the same time as the addition of the t-butyl perethylhexanoate solution. The mixture of (a1), (a2) and (a3) is added at such a rate that the addition is concluded after 5 hours.

After the t-butyl perethylhexanoate solution has been completely added, the polymerization temperature is kept at 110° C. for a further hour. A solution of 0.49 part by weight of t-butyl perethylhexanoate in 3.5 parts by weight of butyl glycol is then added at such a rate that the addition is concluded after 1 h 15 min. The addition of a mixture of (b1): 5.6 parts by weight of acrylic acid, (b2): 3.3 parts by weight of n-butyl acrylate, 2.2 parts by weight of t-butyl acrylate and 1.1 parts by weight of hydroxypropyl acrylate commences at the same time as the addition of the t-butyl perethylhexanoate solution. The mixture of (b1) and (b2) is added at such a rate that the addition is concluded after 1 hour.

At the end of the addition of the t-butyl perethylhexanoate solution, the reaction mixture is kept for a further 1 hour at 110° C.

The resultant resin solution is concentrated by vacuum distillation to a solids content of 80% by weight and is neutralized at about 80° C. with dimethylethanolamine for about 30 min. to a degree of neutralization of 80%. The resin solution is then cooled to 60° C. 40 parts by weight of a 70% solution of a commercial water-thinnable melamine-formaldehyde resin (Maprenal MF 927®) in isobutanol and 0.14 part by weight of a commercial flow control agent (Fluorad FC 430) are then added at 60° C. and the mixture is homogenized for 1 hour at 60° C. Enough water is then added for the solids content of the dispersion to be about 60% by weight.

The resultant dispersion has the following characteristics: number average molecular weight of the polyacrylate resin obtained from (a1), (a2), (a3), (b1) and (b2): 4260, acid value of the total solid: 31.1 mg of KOH/g, solids content (in % by weight; 1 hour, 130° C.): 59.5%.

Topcoat composition 2 T2)

33 parts by weight of butyl glycol are introduced into a steel reaction vessel fitted with a monomer feed, an initiator feed, a thermometer, oil heating and a reflux condenser and the charge is heated to 110° C. A solution of 6.0 parts by weight of t-butyl perethylhexanoate in 6.0 parts by weight of butyl glycol is then added at such a rate that the addition is concluded after 5 h 30 min. The addition of the mixture of (a1): 23.5 parts by weight of n-butyl acrylate, 21.0 parts by weight of t-butyl acrylate, 15.0 parts by weight of methyl methacrylate, (a2): 25.5 parts by weight of hydroxypropyl acrylate and (a3): 15.0 parts by weight of styrene is commenced at the same time as the addition of the t-butyl perethylhexanoate solution. The mixture of (a1), (a2) and (a3) is added at such a rate that the addition is concluded after 5 hours.

After the addition of the t-butyl perethyl hexanoate solution has been completed, the polymerization temperature is kept at 110° C. for a further hour. A solution of 0.79 parts by weight of t-butyl perethylhexanoate in 3.5 parts by weight of butyl glycol is then added at 110° C. at such a rate that the addition is concluded after 1 h 15 min. The addition of the mixture of (b1): 6.0 parts by weight of acrylic acid, (b2): 7.0 parts by weight of n-butyl acrylate, 4.7 parts by weight of t-butyl acrylate and 2.3 parts by weight of hydroxypropyl acrylate is commenced at the same time as the addition of the t-butyl perethylhexanoate solution.

The mixture of (b1) and (b2) is added at such a rate that the addition is concluded after 1 hour.

At the end of the addition of the t-butyl perethylhexanoate solution, the reaction mixture is kept at 110° C. for a further hour.

The resultant resin solution is concentrated by vacuum distillation to a solids content of 80% by weight and neutralized at about 80° C. with dimethylethanolamine within 30 min. to a degree of neutralization of 80%. This resin solution is then cooled to 60° C. 42.9 parts by weight of a 70% solution of a commercial water-thinnable melamine-formaldehyde resin (Maprenal MF 927®) in isobutanol and 0.15 part by weight of a commercial flow control agent (Fluorad FC 430) are then added at 60° C. and the mixture is homogenized at 60° C. for 1 hour. Enough water is then added for the solids content of the dispersion to be about 60% by weight.

The resultant dispersion has the following characteristics: number average molecular weight of the polyacrylate resin obtained from (a1), (a2), (a3), (b1) and (b2): 3990, acid value of the total solid: 30.5 mg of KOH/g, solids content (in % by weight; 1 hour, 130° C.): 59.7%.

B. Application of the transparent topcoat compositions according to the invention and testing of the baked paint films The viscosity of the topcoat compositions prepared according to section A and cooled to room temperature is adjusted with a 10% aqueous dimethylethanolamine solution and distilled water to spray viscosity (24 sec. efflux time from a DIN No. 4 Cup (DIN 53 211 (1974)) and their pH is adjusted to 7.5–7.6. A water-thinnable basecoat composition, pigmented with aluminum platelets and containing polyurethane, polyester and melamine resin, is applied to a phosphated steel panel coated with a commercial electrodeposition primer and commercial body filler in such a way that a dry film thickness of 12–15 μm is obtained. The applied basecoat composition is dried for 10 min. at room temperature and for 10 min. at 80° C. The basecoat is then sprayed with the topcoat compositions prepared according to section A in two cross passes with an intermediate flash-off time. Finally the panel is dried for 20 min. at room temperature and for 30 min. at 130° C. in a circulating air oven. The multicoat coatings obtained in this way were subjected to several tests. The test results are summarized in the following table.

| | Finish using T1 | Finish using T2 |
|---|---|---|
| Application solids content (1 h, 130° C., in % by weight) | 34.1 | 37.9 |
| Thickness of the transparent topcoat (μm) | 42 | 44 |
| Crosshatch test (1) | 0 | 0 |
| Gloss (2) | 84 | 82 |
| DOI | 88 | 87 |
| Degree of blistering (3) after exposure (4) | MOGO | MOGO |
| Gloss (2) after exposure (4) | 82 | 80 |
| DOI after exposure (4) | 86 | 84 |

(1) Test according to DIN 53 151 including the Tesa peel-off test
(2) Degree of gloss according to DIN 67530, angle of 20°
(3) According to DIN 53209
(4) Humidity test at 240 hours at 40° C. (according to DIN 50 017)

We claim:

1. A process for the production of a multicoat protective and/or decorative coating on a substrate surface, in which process (1) a pigmented basecoat composition is applied to the substrate surface,
   (2) a polymer film is formed from the composition applied in stage (1),
   (3) a transparent aqueous topcoat composition containing a water-dispersible polyacrylate resin as binder and an amino resin as crosslinking agent is applied to the basecoat obtained in this way and subsequently
   (4) the basecoat is baked together with the topcoat, wherein the topcoat composition contains a water-dispersible polyacrylate resin as binder, which resin is obtained by a two step solution polymerization process including steps (I) and (II), wherein step (I) includes adding a mixture of (a1) a (meth)acrylic acid ester which is copolymerizable with (a2), (a3), (b1) and (b2) and is essentially free from carboxyl groups, or a mixture of such (meth)acrylic acid esters, and
   (a2) an ethylenically unsaturated monomer which is copolymerizable with (a1), (a3), (b1) and (b2), contains at least one hydroxyl group per molecule and is essentially free from carboxyl groups, or a mixture of such monomers, and, if appropriate,
   (a3) an ethylenically unsaturated monomer which is copolymerizable with (a1), (a2), (b1) and (b2), is essentially free from carboxyl groups and is different from (a1) and (a2), or a mixture of such monomers to an organic solvent or solvent mixture and carrying out a polymerization in the presence of at least one polymerization initiator, and step (II) includes adding, after at least 80% by weight of the mixture consisting of (a1), (a2) and, if appropriate, (a3) has been added, and after at least 80% by weight of the monomers added in step (I) have reacted (b1) more than 25 and less than 60, preferably 33–50% by weight of an ethylenically unsaturated monomer which contains at least one carboxyl group per molecule and is copolymerizable with (a1), (a2), (a3)

and (b2), or a mixture of such monomers, together with (b2) 40–75% by weight of an ethylenically unsaturated monomer which is free from carboxyl groups and is copolymerizable with (a1), (a2), (a3) and (b1), or a mixture of such monomers, and carrying out further polymerization, and following polymerization (III) neutralizing, at least partially, the polyacrylate resin obtained at the end of the polymerization and dispersing it in water, the sum of the proportions by weight of (b1) and (b2) always being 100% by weight and the type and amount of (a1), (a2), (a3), (b1) and (b2) being chosen so that the polyacrylate resin has a hydroxyl value of 40 to 200, preferably 60 to 140, an acid value of 20 to 100, preferably 25 to 50, and a glass transition temperature ($T_G$) of –40° C. to +60° C., preferably –20° C. to +40° C.

2. The process as claimed in claim 1, wherein an aqueous basecoat composition preferably containing metallic pigments is applied in stage (1).

3. The process as claimed in claim 1, wherein the polymerization in stages (I) and (II) is carried out at a temperature of 80° to 160° C., preferably 110° to 160° C. in the presence of at least one free radical-forming initiator and wherein stage (I) takes 2 to 8 hours, preferably 3 to 6 hours, and the addition of the mixture of (b1) and (b2) is carried out within 10 to 90 minutes, preferably within 30 to 75 minutes.

4. The process as claimed in claim 1, wherein the contents of polyacrylate resin and of amino resin together are 20 to 45% by weight, preferably 32 to 40% by weight, at spray viscosity.

5. An aqueous coating composition comprising a water-dispersible polyacrylate resin as binder and an amino resin as crosslinking agent, wherein the water-dispersible polyacrylate resin is obtained by a two step polymerization process including steps (I) and (II), wherein step (I) includes adding a mixture of
(a1) a (meth)acrylic acid ester which is copolymerizable with (a2), (a3), (b1) and (b2) and is essentially free from carboxyl groups, or a mixture of such (meth)acrylic acid esters, and
(a2) an ethylenically unsaturated monomer which is copolymerizable with (a1), (a3), (b1) and (b2), contains at least one hydroxyl group per molecule and is essentially free from carboxyl groups, or a mixture of such monomers, and, if appropriate,
(a3) an ethylenically unsaturated monomer which is copolymerizable with (a1), (a2), (b1) and (b2), is essentially free from carboxyl groups and is different from (a1) and (a2), or a mixture of such monomers to an organic solvent or solvent mixture and carrying out a polymerization in the presence of at least one polymerization initiator, and step (II) includes adding, after at least 80% of the mixture consisting of (a1), (a2) and, if appropriate, (a3) has been added, and after at least 80% by weight of the monomers added in step (I) have reacted
(b1) more than 25 and less than 60, preferably 33–50% by weight of an ethylenically unsaturated monomer which contains at least one carboxyl group per molecule and is copolymerizable with (a1), (a2), (a3) and (b2), or a mixture of such monomers, together with
(b2) 40–75% by weight of an ethylenically unsaturated monomer which is free from carboxyl groups and is copolymerizable with (a1), (a2), (a3) and (b1), or a mixture of such monomers, and carrying out further polymerization, and (III) at the end of the polymerization the resultant polyacrylate resin is neutralized, at least partially, and dispersed in water, the sum of the proportions by weight of (b1) and (b2) always being 100% by weight and the type and amount of (a1), (a2), (a3), (b1) and (b2) being chosen so that the polyacrylate resin has a hydroxyl value of 40 to 200, preferably 60 to 140, an acid value of 20 to 100, preferably 25 to 50, and a glass transition temperature ($T_G$) of –40° C. to +60° C., preferably –20° C. to +40° C.

6. The coating composition as claimed in claim 5, wherein the polymerization in stages (I) and (II) is carried out at a temperature of 80° to 160° C., preferably 110° to 160° C. in the presence of at least one free radical-forming initiator and wherein stage (I) takes 2 to 8 hours, preferably 3 to 6 hours, and the addition of the mixture of (b1) and (b2) is carried out within 10 to 90 minutes, preferably within 30 to 75 minutes.

7. The coating composition as claimed in claim 5, wherein the contents of polyacrylate resin and of amino resin together are 20 to 45% by weight, preferably 32 to by weight, at spray viscosity.

8. A water-dispersible polyacrylate resin which is obtained by a two step polymerization process including steps (I) and (II), wherein step (I) includes adding a mixture of
(a1) a (meth)acrylic acid ester which is copolymerizable with (a2), (a3), (b1) and (b2) and is essentially free from carboxyl groups, or a mixture of such (meth)acrylic acid esters, and
(a2) an ethylenically unsaturated monomer which is copolymerizable with (a1), (a3), (b1) and (b2), contains at least one hydroxyl group per molecule and is essentially free from carboxyl groups, or a mixture of such monomers, and, if appropriate,
(a3) an ethylenically unsaturated monomer which is copolymerizable with (a1), (a2), (b1) and (b2), is essentially free from carboxyl groups and is different from (a1) and (a2), or a mixture of such monomers to an organic solvent or solvent mixture and carrying out a polymerization in the presence of at least one polymerization initiator, and wherein step two includes adding, after at least 80% of the mixture consisting of (a1), (a2) and, if appropriate, (a3) has been added, and after at least 80% by weight of the monomers added in step (I) have reacted
(b1) more than 25 and less than 60, preferably 33–50% by weight of an ethylenically unsaturated monomer which contains at least one carboxyl group per molecule and is copolymerizable with (a1), (a2), (a3) and (b2), or a mixture of such monomers, together with
(b2) 40–75% by weight of an ethylenically unsaturated monomer which is free from carboxyl groups and is copolymerizable with (a1), (a2), (a3) and (b1), or a mixture of such monomers, and carrying out further polymerization, and (III) at the end of the polymerization the resultant polyacrylate resin is neutralized, at least partially, and dispersed in water, the sum of the proportions by weight of (b1) and (b2) always being 100% by weight and the type and amount of (a1), (a2), (a3), (b1) and (b2) being chosen so that the polyacrylate resin has a hydroxyl value of 40 to 200, preferably 60 to 140, an acid value of 20 to 100, preferably 25 to 50, and a glass transition temperature ($T_G$) of –40° C.

to +60° C., preferably −20° C. to +40° C.

9. The polyacrylate resin as claimed in claim 8, wherein in stages (I) and (II) polymerization is carried out at a temperature of 80° to 160° C., preferably 110° to 160° C., in the presence of at least one free radical-forming initiator, and wherein stage (I) takes 2 to 8 hours, preferably 3 to 6 hours, and the addition of the mixture of (b1) and (b2) is carried out within 10 to 90 minutes, preferably within 30 to 75 minutes.

10. A process for the preparation of water-dispersible polyacrylate resins, comprising a two step solution polymerization process, wherein (I) a mixture of
- (a1) a (meth)acrylic acid ester which is copolymerizable with (a2), (a3), (b1) and (b2) and is essentially free from carboxyl groups, or a mixture of such (meth)acrylic acid esters, and
- (a2) an ethylenically unsaturated monomer which is copolymerizable with (a1), (a3), (b1) and (b2), contains at least one hydroxyl group per molecule and is essentially free from carboxyl groups, or a mixture of such monomers, and, if appropriate,
- (a3) an ethylenically unsaturated monomer which is copolymerizable with (a1), (a2), (b1) and (b2), is essentially free from carboxyl groups and is different from (a1) and (a2), or a mixture of such monomers is added to an organic solvent or solvent mixture and a polymerization is carried out in the presence of at least one polymerization initiator, and (II) after at least 80% by weight of the mixture consisting of (a1), (a2) and, if appropriate, (a3) has been added, and after at least 80% by weight of the monomers added in step (I) have reacted

- (b1) more than 25 and less than 60, preferably 33–50% by weight of an ethylenically unsaturated monomer which contains at least one carboxyl group per molecule and is copolymerizable with (a1), (a2), (a3) and (b2), or a mixture of such monomers, together with
- (b2) 40–75% by weight of an ethylenically unsaturated monomer which is free from carboxyl groups and is copolymerizable with (a1), (a2), (a3) and (b1), or a mixture of such monomers, are added and further polymerization is carried out and (III) at the end of the polymerization the resultant polyacrylate resin is neutralized, at least partially, and dispersed in water, the sum of the proportions by weight of (b1) and (b2) always being 100% by weight and the type and amount of (a1), (a2), (a3), (b1) and (b2) being chosen so that the polyacrylate resin has a hydroxyl value of 40 to 200, preferably 60 to 140, an acid value of 20 to 100, preferably 25 to 50, and a glass transition temperature ($T_G$) of −40° C. to +60° C., preferably −20° C. to +40° C.

11. The process as claimed in claim 10, wherein in stages (I) and (II) polymerization is carried out at a temperature of 80° to 160° C. preferably 110° to 160° C., in the presence of at least one free radical-forming initiator, and wherein stage (I) takes 2 to 8 hours, preferably 3 to 6 hours, and the addition of the mixture of (b1) and (b2) is carried out within 10 to 90 minutes, preferably within 30 to 75 minutes.

* * * * *